(12) United States Patent
Wesselmann

(10) Patent No.: US 9,278,300 B2
(45) Date of Patent: Mar. 8, 2016

(54) APPLIANCE FOR FILTERING LIQUIDS, IN PARTICULAR WASTE WATER, AND METHOD FOR FILTERING LIQUIDS

(75) Inventor: Reinhold Wesselmann, Cloppenburg (DE)

(73) Assignee: Reinhold Wesselmann GmbH, Lastrup/Nieholte (DE)

( * ) Notice: Subject to any disclaimer, the term of this patent is extended or adjusted under 35 U.S.C. 154(b) by 2 days.

(21) Appl. No.: 14/236,647

(22) PCT Filed: Aug. 6, 2012

(86) PCT No.: PCT/DE2012/000789
§ 371 (c)(1),
(2), (4) Date: May 21, 2014

(87) PCT Pub. No.: WO2013/017123
PCT Pub. Date: Feb. 7, 2013

(65) Prior Publication Data
US 2014/0291260 A1    Oct. 2, 2014

(30) Foreign Application Priority Data
Aug. 4, 2011    (DE) .............. 20 2011 104 039 U

(51) Int. Cl.
| | |
|---|---|
| B01D 33/00 | (2006.01) |
| B01D 33/15 | (2006.01) |
| B01D 33/41 | (2006.01) |
| B01D 25/26 | (2006.01) |
| B01D 33/21 | (2006.01) |
| B01D 33/23 | (2006.01) |
| C02F 1/00 | (2006.01) |
| B01D 33/37 | (2006.01) |
| B01D 33/39 | (2006.01) |

(52) U.S. Cl.
CPC .............. B01D 33/41 (2013.01); B01D 25/26 (2013.01); B01D 33/21 (2013.01); B01D 33/23 (2013.01); C02F 1/001 (2013.01)

(58) Field of Classification Search
CPC .... B01D 33/41; B01D 33/0048; B01D 33/21; B01D 33/23; B01D 33/155; B01D 33/215; B01D 2315/04
See application file for complete search history.

(56) References Cited

U.S. PATENT DOCUMENTS

| | | | | |
|---|---|---|---|---|
| 2,770,370 | A | * | 11/1956 | Griffiths ................... 210/344 |
| 5,176,829 | A | * | 1/1993 | Drori ..................... 210/346 |
| 5,925,247 | A | * | 7/1999 | Huebbel ............. 210/321.75 |
| 2002/0014449 | A1 | * | 2/2002 | Rios et al. ........... 210/321.67 |
| 2006/0138039 | A1 | * | 6/2006 | Rudolf et al. ............ 210/407 |

FOREIGN PATENT DOCUMENTS

| | | |
|---|---|---|
| DE | 22 49 468 A1 | 4/1974 |
| EP | 1 854 530 A1 | 11/2007 |
| JP | 2009 226377 A | 10/2009 |

OTHER PUBLICATIONS

International Search Report of PCT/DE2012/000789, mailed Feb. 13, 2013.

* cited by examiner

Primary Examiner — Krishnan S Menon
Assistant Examiner — Bradley R Spies
(74) Attorney, Agent, or Firm — Collard & Roe, P.C.

(57) ABSTRACT

In an appliance for filtering liquids, in particular waste water, with filter discs lying on top of one another and forming a flow path for a liquid to be filtered, wherein the appliance has at least one device for generating a movement of the filter discs, provision is made that the filter discs have means by which mutually adjacent filter discs are connected to one another with a form fit, these means being assigned to at least one circumferential portion of the filter disc. In particular, the means for form-fit connection are assigned to two mutually opposite circumferential portions of the filter disc.

24 Claims, 4 Drawing Sheets

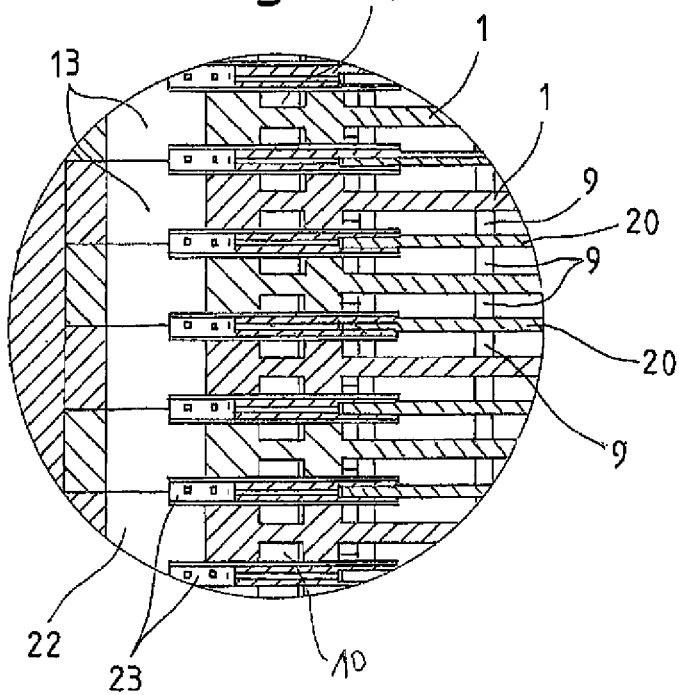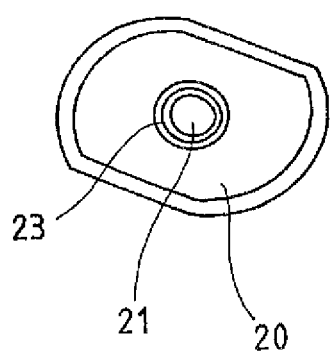

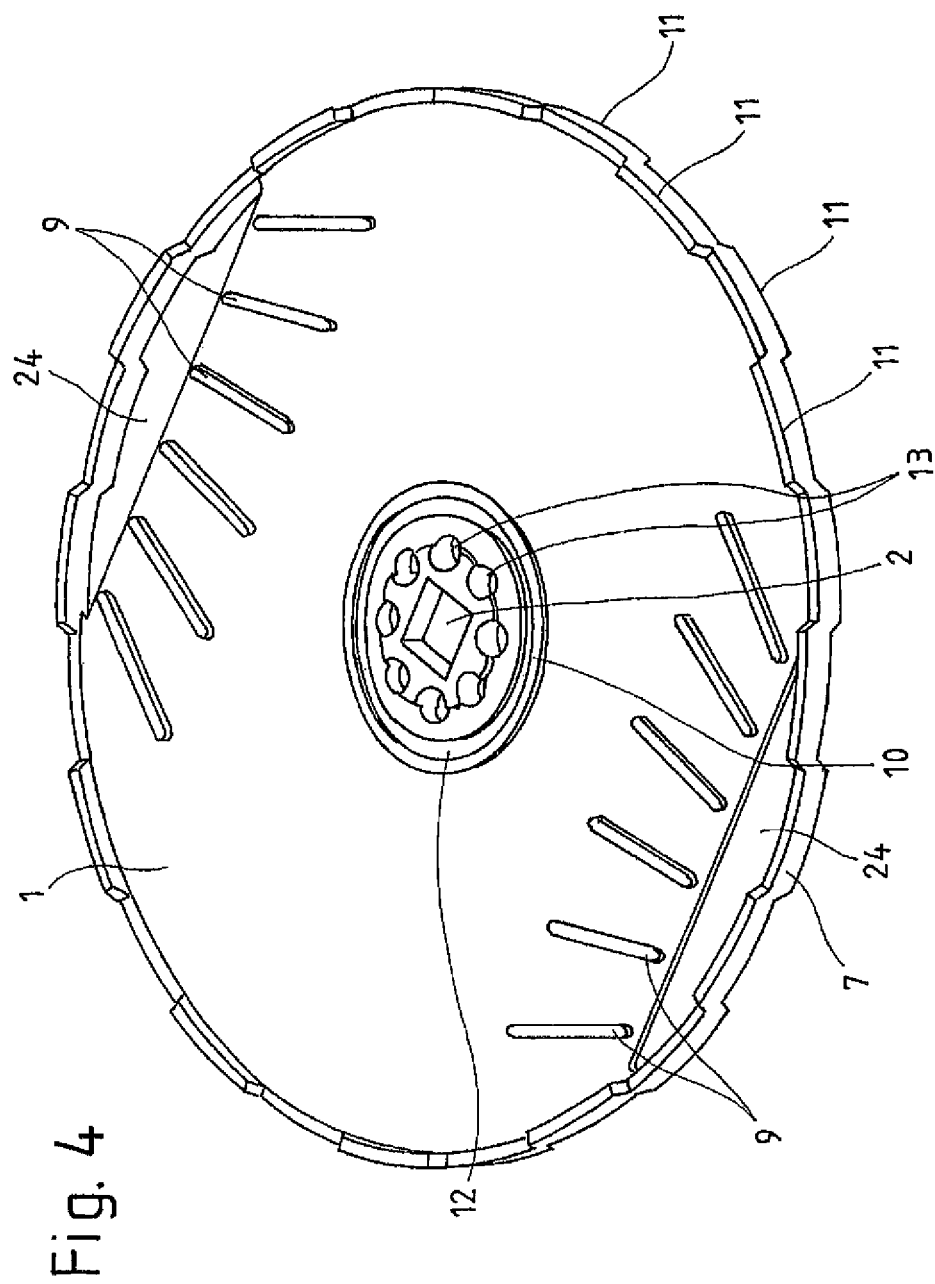

Figure 1:
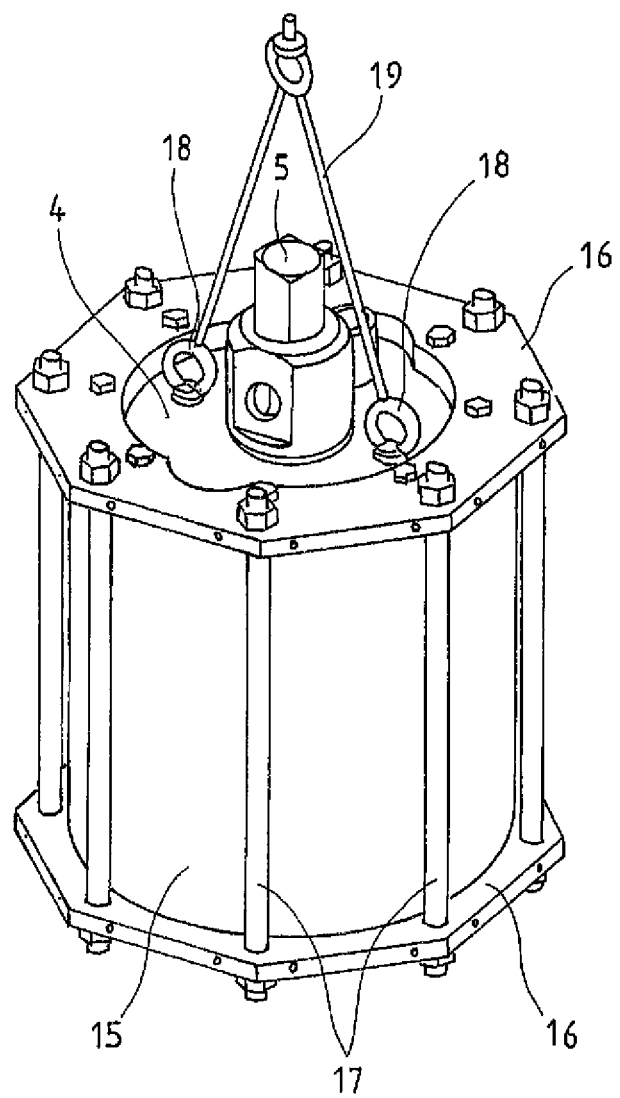

APPLIANCE FOR FILTERING LIQUIDS, IN PARTICULAR WASTE WATER, AND METHOD FOR FILTERING LIQUIDS

CROSS REFERENCE TO RELATED APPLICATIONS

This application is the National Stage of PCT/DE2012/000789 filed on Aug. 6, 2012 which claims priority under 35 U.S.C. §119 of German Application No. 20 2011 104 039.2 filed on Aug. 4, 2011, the disclosure of which is incorporated by reference. The international application under PCT article 21(2) was not published in English.

The invention relates to a device for filtering liquids, in particular waste water, with filter discs lying on top of one another that form a flow path for a liquid to be filtered, wherein it exhibits at least one appliance for generating a movement by the filter discs. The invention further relates to a method for filtering liquids, in particular waste water, using an aforementioned device.

Liquids are often present in a contaminated state or in a state loaded with thick matter or foreign substances. Such liquids can be dirty water, oily water, and iron-laden water. A device of the generic type mentioned at the outset is used to dissolve the substances out of the liquid, e.g., so that the purified liquid can be reused in this way. Other applications include drinking water treatment, e.g., of water from rivers and seas, the food industry (dairies, wineries), as well as recovery from liquids.

A device mentioned at the outset was already proposed in prior art for ultra-filtration. This device exhibits filter discs, which form a flow path for the liquid. The liquid is guided past filter pores. A portion of the liquid passes through the filter pores, for example because a region with lower pressure conditions is present on the opposite side. Therefore, the liquid to be filtered is guided along the filter pores, and a portion of the liquid is then removed from the liquid to be filtered.

However, the known device is associated with the risk that substances present in the liquid might clog the filter pores. The filtration power is reduced. For this reason, it has already been proposed that the filter discs be moved. However, only limited movement is here possible, since filter discs can slip.

The object of the invention is to indicate a device of the generic type mentioned at the outset that enables a reliable filtration of a liquid without the danger of the filter pores becoming clogged and without any slippage by the filter discs.

This object is achieved according to the invention by virtue of the fact that the filter discs exhibit means for positively connecting adjacent filter discs, wherein these means are allocated to at least one circumferential section of the filter disc.

No static operation is provided in the device according to the invention. The device has allocated to it a motion device, which can impart movements to the filter discs. These movements prevent substances from being able to become deposited and lodged in the filter pores. The filter discs are made to move, thereby continually pulling them away under the liquid loaded with foreign substances, for example. Since the liquid continues to be guided through the device during this continual pulling away, suspended matter that is present at a certain location on the filter discs beforehand arrives in other regions at later points in time. There is no lingering at specific locations.

To prevent the filter discs in the device according to the invention from changing their position despite being exposed to the kinetic energy, the invention provides that the filter discs exhibit means for positively connecting adjacent filter discs. The individual filter discs lie one on top of the other. Therefore, they each directly abut against adjacent filter discs or against a floor or cover. The means for establishing a positive connection engage with the filter discs, thereby providing an anti-locking safeguard. The floor or cover can also exhibit such positive connecting means, which act on the respective filter disc lying on the outside. The means for positively connecting the adjacent filter discs are here designed in such a way that they can transmit forces. This is already ensured just by virtue of the fact that the means are allocated to at least one circumferential section of the filter disc. Therefore, means are not arranged at several points, for example just for orienting the alignment of filter discs lying one on top of the other. Rather, means for establishing a positive connection are provided over a longer area, specifically over a circumferential area.

The device for generating the movement is preferably an oscillation drive. Such a drive allows an alternating motion, which is executed over a short path section. For example, the motion can be a reciprocating motion, which does not require a large path, and hence installation space. A limited rotation of the filter discs preferably takes place, so that reciprocal turning motion is performed with the oscillation drive. The filter discs are made to vibrate, with the motions being accelerated. A resonant vibration is preferably imparted to the filter discs, in which case only a small amount of energy must be introduced by the oscillation drive to sustain this vibration. The filter discs are preferably accommodated in a housing, through which the liquid to be filtered is guided. The housing can be situated in a subframe by way of spring elements, whereupon the drive is used to introduce a vibration in the subframe. The flexible suspension of the housing amplifies this vibration to generate rotational movements, e.g., of 12 mm. The flow rate of the liquid here measures between 1 m and 2 m/s, for example.

A first further development of the invention provides that the means for establishing a positive connection be allocated to two opposing circumferential sections of the filter disc. Dividing the positive connecting means between two circumferential sections distributes the arising forces among two sections of the filter disc. The means are arranged on mutually opposing circumferential sections, so that equally large sections of the filter disc circumference lie between both targets of the forces. The circumferential sections with the means for establishing a positive connection here preferably take up larger portions of the circumferential sections, wherein at least circumferential sections larger than 180° are equipped with means for establishing a positive connection.

Arranging the means for establishing positive connections on the circumferential sections of the filter discs also results in favourable leverage ratios.

A next further development of the invention provides that the means for establishing a positive connection be formed by projections and recesses arranged on the surface of each filter disc. Projections on one filter disc can engage into the recesses of an adjacent filter disc. This yields a reliable, positive bond. The projections and recesses make it possible to create a wave contour incorporated into the outer edge of each filter disc. In terms of structural design, the projections can resemble teeth, which can project into correspondingly congruently shaped tooth gaps.

In order to form each filter disc itself, a further development of the invention provides that the latter consist of two membrane plates lying one on top of the other. This configuration yields stability for the filter disc. Each filter disc has two walls, with both walls being comprised of plates. Because the fabricated plates are thin, they are referred to as membrane plates.

The filter discs are then placed one on top of the other, and insertion filter elements can be situated between each. The filter discs themselves exhibit openings through which to guide the liquid to be filtered, when then flows between two filter discs lying one on top of the other, passing by the insertion filter elements in the process. Water can pass through the walls and pores of the insertion filter element, and be dissolved out of the liquid to be filtered. The membrane plates are provided with projections, which prevent the insertion filter element from directly abutting flatly against the membrane plates on the one hand, while these projections also serve as water conducting elements on the other.

Another further development of the invention provides that the filter discs be slipped onto at least one central mandrel, the free ends of which exhibit means for pressing the filter discs onto each other. The filter discs lie directly on top of each other. They are here guided through a central mandrel. The end of the latter has means for pressing the filter discs onto each other. As a consequence, the filter discs are exposed to a force that, in addition to establishing the positive connection, e.g., due to the wave contour, also brings about a non-positive connection between the filter discs. The projections that were moulded in or placed on impart a waviness to the filter discs, which given an existing elasticity for the filter disc material produces a spring resistance. Crimping these filter discs causes the filter discs to become compressed. While the spring resistance lessens somewhat if the pressing force decreases a bit, the filter discs continue to lie securely on top of each other, in particular safeguarded against twisting.

The central mandrel can have a non-rotationally symmetrical, e.g., angular, cross section. This also helps prevent the filter discs from twisting to an extent, specifically if the latter each exhibit an angular opening through which the central mandrel is routed, and the dimensions of the central mandrel and opening are roughly the same. As a consequence, the central mandrel provides a safeguard against twisting for the filter discs, but also orients the filter discs relative to each other and positions them in a rotationally correct manner relative to each other.

In order to allocate the filter discs to each other securely in position, the positively intermeshing means are thus provided on the filter discs that do not provide a rotationally symmetrical configuration of the central mandrel and the application of a pressing force on the filter disc. In this way, the filter discs are secured in several ways against inadvertent slippage.

In order to increase the non-positive fit between the filter discs, means in addition to the central mandrel can also be provided for pressing the filter discs onto each other, for example tie anchors secured to the outside of the housing.

A next further development of the invention provides that the free ends of the central mandrel have arranged on them flange plates, whose side allocated to the filter discs each exhibit a contour identical to the contour of the filter disc. A pressing force is applied on the filter discs along the central mandrel. In terms of structure, application takes place via the flange plates that are arranged on the free ends of the central mandrel, and form a floor and cover for the housing. Flange plates are provided with the contour of the filter discs, so that the latter can be made to properly abut against the filter discs, and an insertion filter element can already be placed between each flange plate and the filter disc lying on the outside. Therefore, the flange plates also exhibit teeth as projections for establishing a positive connection, for example, wherein projections can also be provided for abutment of the insertion filter element and the water line. For example, the contours are welded or moulded onto the flange plates.

Preferably arranged in the centre of each filter disc is an insertion block part, which exhibits an opening for guiding through the central mandrel. The membrane plates hold the insertion filter element for separating out parts of the liquid loaded with substances. The insertion block part arranged in the centre of the filter disc here strengthens the filter disc. In addition, the insertion block part provides the opening for guiding through the central mandrel. More openings can be provided for draining the liquid after it has been filtered. Apart from the opening for the central mandrel, the additional openings for draining the liquid are preferably arranged around the central mandrel opening. As a consequence, filtered liquid can drain from all sides. More openings for draining the filtrate can also be provided in the absence of an insertion block part.

As a consequence, the central mandrel area is provided with the capacity to drain filtered liquid. The pressure ratios in this area are set so low as to generate a pressure inside the device to force water through the insertion filter elements. The liquid is introduced into the device according to the invention with a pressure, and the liquid outlet can be pre-stressed to maintain this pressure. Parts of the liquid then proceed to an area with lower pressure, passing through the insertion filter elements.

The components of the filter discs are preferably welded together, in particular laser-welded. As a result, they can be fabricated true to size, and be joined together true to size. The filter discs are preferably made out of high-grade steel, in particular via hydroforming, as this manufacturing process enables a dimensionally stable fabrication. As an alternative, the filter discs can also be made out of a plastic or ceramic.

In order to obtain a desired water line, each filter disc is equipped with a flat gasket, which preferably is inserted into a groove incorporated in the surface of the filter disc. The insertion process can be facilitated with an adhesive. The flat gasket can reliably absorb forces, and its greater width makes it possible to more securely fix the flat gasket in place on the filter disc. The flat gasket can also be secured to the insertion filter element.

Manufacturing the filter discs along with corresponding configurations for the flange plates via hydroforming enables a dimensionally stable fabrication with defined heights. These heights are important for pressing on the filter discs and seals carried by the filter discs in a defined manner.

The method according to the invention achieves the objective by using an oscillator drive with a frequency of $\geq 50$ Hz as the device for generating a movement by the filter discs.

Operating the oscillator drive at such a high frequency accelerates the movement of the filter discs, with the advantageous result of allowing a high throughput of liquid to be filtered. The effectiveness of the method according to the invention is elevated. Using the device according to the invention with the filter discs securely positioned relative to each other precludes any slippage during such an accelerated movement by the filter discs.

The oscillating motion of the filter discs can measure about 10 mm in each direction proceeding from a central position. As a consequence, the overall path traversed by the filter discs measures about 20 mm, thereby enabling a distinct relative movement between the filter discs and conveyed liquid.

The liquid to be filtered can be dispensed into the used device with a high pressure. Pressures of up to 90 bar are possible, wherein the latter produce a high gradient between the areas separated by the insertion filter element.

Figure 2:
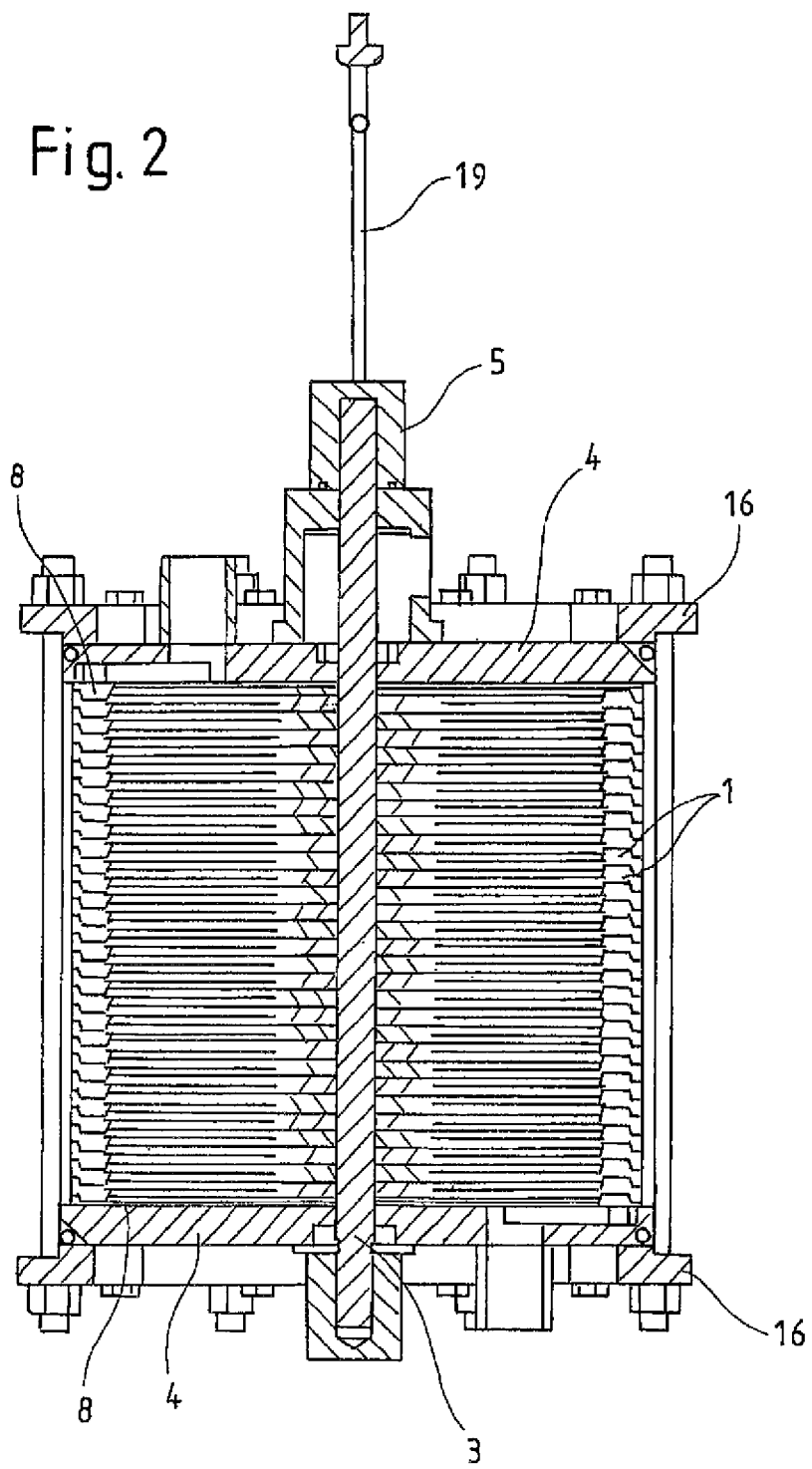

The drawing presents an exemplary embodiment of the invention, from which additional inventive features may be gleaned. Shown on:

FIG. 1: is a perspective view of a device for filtering liquids;

FIG. 2: is a sectional view of the device according to FIG. 1;

FIG. 3: is a dimensionally magnified view of a detail from FIG. 2;

FIG. 4: is a dimensionally magnified, perspective view of a filter disc of the device according to FIG. 1, and on FIG. 5: is a perspective view for an insertion filter element.

The filter device on FIG. 1 exhibits a tubular housing 15. The free edges of this tubular housing 15 are bordered by two collar rings 16, which are each guided by way of tie anchors 17 against the housing 15. Flange plates 4 lie below the collar rings 16. Eyelets 18 are secured to the upper flange plate 4, and have hook means 19 attached to them.

As shown on FIG. 2, filter discs 1 are arranged between the flange plates 4. The filter discs 1 are circular in design, and have an opening 2 in their centre (FIG. 4). This opening 2 is used to slip the filter discs 1 onto a central mandrel 3.

The flange plates 4 are situated at the free ends of the central mandrel 3 as the floor and cover. The space between both flange plates 4 is completely filled with filter discs 1 with the device ready for operation. A tightening nut 5 placed on the central mandrel 3 can be used to move both flange plates 4 closer to each other, wherein filter discs 1 arranged between the flange plates 4 are here compressed.

As evident from FIGS. 2 and 4, the filter discs 1 have a wave contour 7, which yields means for positively connecting adjacent filter discs 1. Projections 9 for guiding the liquid are provided on the surface of the filter disc 1. Also provided on the filter disc 1 is a flat gasket 10.

The projections 9 for guiding the liquid are also shown on FIG. 3. As may be gleaned from FIG. 3, the filter insertion element 20 is fixed between two projections 9. It is held between the projections 9 of two consecutive filter discs 1. The insertion filter element 20 is depicted on FIG. 5. It has a circular opening 21 for guiding through the central mandrel 3 and abutment against insertion block parts 12 present in the centre of each filter disc 1 (FIG. 4). Liquid to be filtered flows through the gap between two adjacent filter discs 1, traveling along the insertion filter element 20. Liquid can enter the insertion filter element 20, and within the latter flows toward the central mandrel 3, where the openings 13 present in the abutment block part 12 (FIG. 4) form a channel 22 for the filtrate.

In order to border the opening 21, the insertion filter element 20 has placed inside of it a ring 23 with openings; this ring 23 with openings 21 is visible on FIG. 3. The water passes through these openings and into the channel 22.

The side of the flange plate 4 facing away from the filter discs 1 is covered by a contour 8 adjusted to the contour of the filter discs 1. The contour 8 can be moulded into the flange plate 4, wherein a corresponding contour 8 can even be welded on.

FIG. 4 shows the wave contour of the filter disc 1. The wave contour is generated by projections 11 alternatingly placed on the filter disc 1. These projections 11 can protrude in corresponding valleys of an adjacent filter disc 1. Opposing circumferential areas of the filter 1 incorporate passages 24 for the liquid to be filtered. The liquid to be filtered can then flow through these passages 24 from the surface of the filter disc 1 shown on FIG. 4 onto the surface of an underlying filter disc 1. The liquid on the filter disc shown on FIG. 4 flows along an insertion filter element 20, and then hits the next insertion filter element 20 on the underlying filter disc 1. While the water can alternate its flowing direction after each filter disc 1, a parallel operation of several directly opposing filter discs 1 is also possible.

The invention claimed is:

1. A device for filtering liquids, comprising filter discs lying on top of one another that form a flow path for a liquid to be filtered, and at least one drive for generating a movement of the filter discs, wherein the filter discs have devices for positively connecting adjacent filter discs, wherein these devices are allocated to at least one circumferential section of the filter disc, wherein the devices for establishing a positive connection comprise projections and recesses arranged on the surface of each filter disc, and wherein the projections on one filter disc engage into the recesses of an adjacent filter disc.

2. The device according to claim 1, wherein each filter disc is roughly circular in design, and the devices for establishing a positive connection are allocated to circumferential sections larger than 180° on the circumference of the filter disc.

3. The device according to claim 1, wherein each filter disc is roughly circular in design, and wherein the devices for establishing a positive connection are allocated to circumferential sections larger than 10° on the circumference of the filter disc.

4. The device according to claim 1, wherein the projections and recesses comprise a wave contour introduced into the outer edge of each filter disc.

5. The device according to claim 4, wherein the wave contour comprises teeth attached to the surface of the filter disc.

6. The device according to claim 1, wherein each filter disc comprises two membrane plates lying one on top of the other.

7. The device according to claim 1, wherein the filter discs are slipped onto at least one central mandrel, whose free ends comprise pressing devices for pressing the filter discs onto each other.

8. The device according to claim 7, wherein the central mandrel has an angular cross section.

9. The device according to claim 8, wherein each filter disc has an opening with a cross section identical to the cross section of the central mandrel.

10. The device according to claim 7, further comprising other pressing devices apart from the central mandrel for pressing the filter discs onto each other.

11. The device according to claim 7, wherein the free ends of the central mandrel have arranged on them flange plates, whose side allocated to the filter discs each exhibit a contour identical to the contour of the filter disc.

12. The device according to claim 7, wherein an insertion block part is arranged in the center of each filter disc, and exhibits an opening for guiding through the central mandrel.

13. The device according to claim 12, wherein the insertion block part further comprises additional openings for a filtered liquid.

14. The device according to claim 1, wherein each filter disc has openings for a filtered liquid.

15. The device according to claim 12, wherein the components of the filter disc are welded together.

16. The device according to claim 1, wherein the filter discs are made out of high-grade steel.

17. The device according to claim 1, wherein at least one groove for a flat gasket is introduced into the surface of each filter disc.

18. The device according to claim 17, wherein each flat gasket is secured to the filter disc by way of an adhesive.

19. The device according to claim 1, wherein projections are arranged on the surface of each filter disc.

20. The device according to claim 1, wherein the drive for generating the movement is an oscillation drive.

21. A method for filtering liquids using a device according to claim 1, wherein an oscillator drive with a frequency of 50 Hz is used as the device for generating a movement by the filter discs.

22. The method according to claim 21, wherein the oscillating motion of the filter discs measures about 10 mm in each direction proceeding from a central position.

23. The method according to claim 21, wherein the liquid to be filtered is dispensed in the used device with a pressure of up to 90 bar.

24. The device according to claim 1, wherein an insertion filter element is disposed between adjacent filter discs, and
    wherein each filter disc has an interior section having interior projections which prevent the insertion filter element from directly abutting flatly against the filter discs and which guide the liquid to be filtered.

\* \* \* \* \*